United States Patent [19]

Mittendorf et al.

[11] 3,987,863
[45] Oct. 26, 1976

[54] VEHICLE INSECT PROTECTION APPARATUS

[76] Inventors: Theodor H. Mittendorf, 601 N. McDonald St., Apt. 601; William E. Keough, 969 W. 11th Ave., both of Mount Dora, Fla. 32757

[22] Filed: Dec. 29, 1975

[21] Appl. No.: 644,930

[52] U.S. Cl. .................. 180/68 P; 296/91
[51] Int. Cl.² .......................... B60J 7/20
[58] Field of Search ............ 180/68 P; 296/91; 280/502; 224/42.03 B, 42.03 A, 42.03 R; 160/DIG. 1, DIG. 2

[56] References Cited
UNITED STATES PATENTS

| | | | |
|---|---|---|---|
| 2,486,161 | 10/1949 | Hughes | 280/502 |
| 2,487,496 | 11/1949 | Tyson | 280/502 |
| 2,726,727 | 12/1955 | Abramson | 180/68 P |
| 2,778,439 | 1/1957 | Pfingsten | 180/68 P |
| 2,792,254 | 5/1957 | Hagglund | 180/68 P |
| 2,868,308 | 1/1959 | Biewald | 180/68 P |
| 3,831,696 | 8/1974 | Mittendorf et al. | 180/68 P |
| 3,841,544 | 10/1974 | Berger | 224/42.03 B |
| 3,863,728 | 2/1975 | Mittendorf | 180/68 P |

*Primary Examiner*—Robert R. Song
*Assistant Examiner*—David M. Mitchell
*Attorney, Agent, or Firm*—Duckworth, Hobby, Orman, Allen & Pettis

[57] ABSTRACT

An insect protection apparatus for protecting moving vehicles from insects having a rigid frame at least partially covered with a screen to prevent the passage of insects therethrough. The frame has a bumper attaching system which may be easily attached to most vehicle bumpers and which allows the frame to be rapidly attached and removed from the bumper attaching system. A deflector shield may also be attached to the front of the rigid frame and the bumper attaching system may be aligned to align the frame in front of the vehicle.

8 Claims, 7 Drawing Figures

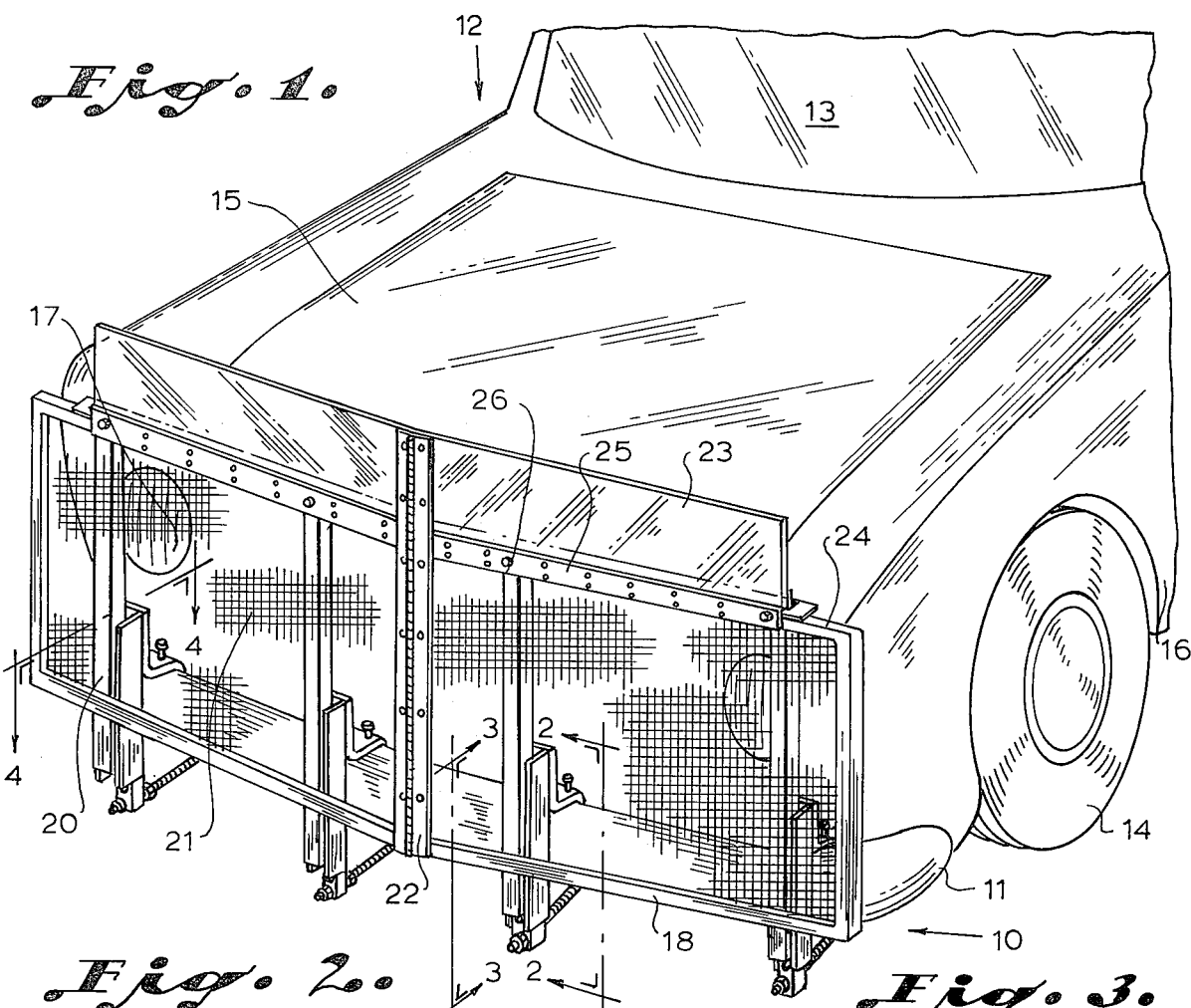

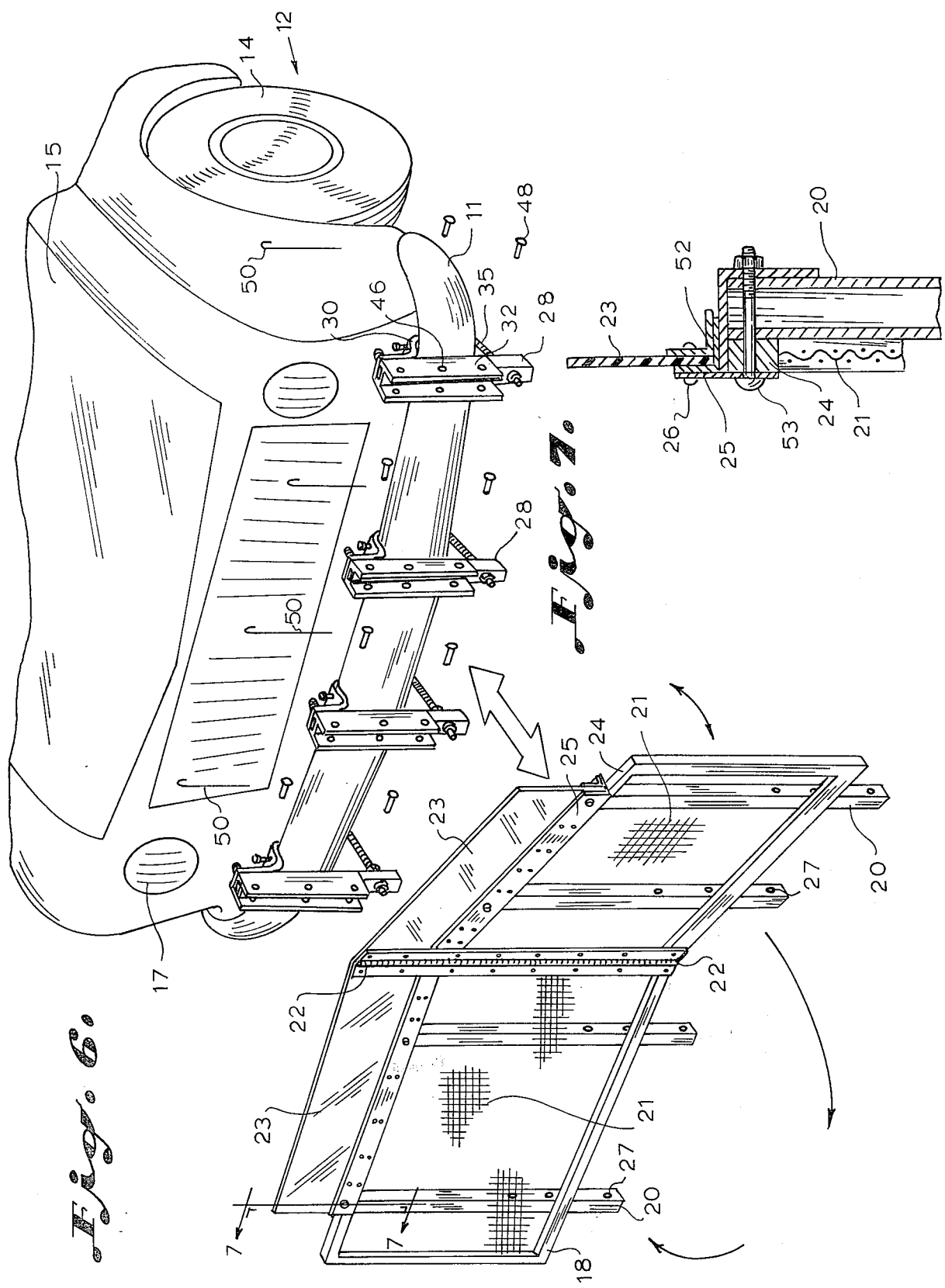

3,987,863

VEHICLE INSECT PROTECTION APPARATUS

BACKGROUND OF THE INVENTION

The present invention relates to a vehicle protection device for preventing insects and other materials from messing up the windshield and front end of a moving vehicle and from stopping up the radiator of the vehicle.

In the past it has been common to provide a great many deflectors for placement on different portions of a vehicle for controlling air currents and to prevent windshields from becoming messed up. One such deflector is placed on the top rear of a station wagon or automobile to control air currents to prevent the rear window from becoming covered with dirt, and the like, from the eddy currents created by the vehicle. Other such devices provide deflectors placed on the hood, or on the side vent windows for either controlling the air current or deflecting insects to prevent the insects from splattering against the windshield or from getting into the automobile. One prior U.S. Pat. No. 3,269,455 teaches a bug screen employing a metallic frame having spring loaded latching means for attaching to the front of a vehicle. Such screens are used for catching insects while similar screens on the front of vehicles are also used to prevent other trash from getting into the radiator as well as providing some crash protection for passengers in the vehicle. In addition, the present invention provides for protection for the headlights which can loose some of their reflectiveness by a large number of insects being splattered thereon and from hitting the windshield which reduces the visibility of the driver and passengers in the vehicle. This problem is especially acute in some southern states where twice a year lovebugs enter their breeding season with very large numbers of slow moving mating bugs around the highways which can completely cover the front end and windshield of a vehicle. The bugs are very difficult to clear off of the windshield and front of the vehicle and to remove from the vehicles' radiator. One protection system that has been suggested wraps a piece of screen around the front end of the vehicle. This, however, does not protect the windshield of the vehicle and still allows the front end of the vehicle to become messed up by the splattered bugs oozing through the screen onto the front of the radiator.

Other prior art includes U.S. Pat. No. 2,792,254 which is a bug and gravel shield for vehicles and includes air guides to direct air currents hitting the front of the vehicle, and U.S. Pat. No. 2,778,439 which is a combination radiator screen and insect deflector for windshields. U.S. Pat. No. 2,726,727 illustrates bracing means for the upper portion of automobile protective screens, and U.S. Pat. No. 2,868,308 illustrates a bug shield for automobiles having an attached shield. These prior patents, however, do not illustrate a combination of an insect protection screen and windshield bug deflector which are adjustable for a great variety of vehicles by being attachable to a great variety of automobile bumpers by the flexibility of the attaching system. The present system can thus be rapidly attached and detached from the vehicle.

SUMMARY OF THE INVENTION

An insect protection apparatus for moving vehicles is provided having a rigid frame with a screen covering at least a portion of the rigid frame and attached to the frame. A bumper attaching system may be easily attached to the front bumper of a vehicle and is adjustable for a great variety of vehicle bumpers. The bumper attaching system provides means for rapidly attaching and detaching the rigid frame of the insect protection apparatus and includes a plurality of brackets each having top and bottom hooks for hooking onto the top and bottom edges of the bumper. Each bottom and top hook are connected by a frame supporting member which may be aligned vertically and is adapted to quickly insert a portion of the rigid frame and to lock the frame therein with pins, or the like. The top hook of each bracket has a bolt threaded therethrough for abutting the bumper for aligning the top hook while the bottom hook is connected to the elongated frame holding member by a threaded member which may be adjusted to align the elongated frame holding member in a vertical direction. The rigid frame may include two or more rigid frame portions hinged together and may have a wind deflector shield attached to the top portion thereof.

BRIEF DESCRIPTION OF THE DRAWINGS

Other objects, features, and advantages of this invention will be apparent from a study of the written description and the drawings in which:

FIG. 1 is a perspective view of an insect protection apparatus for moving vehicles illustrated attached to the front end of a vehicle;

FIG. 2 is a sectional view taken along the line 2—2 of FIG. 1;

FIG. 3 is a sectional view taken along the line 3—3 of FIG. 1;

FIG. 6 is an exploded perspective view of the insect protection apparatus of the present invention removed from its bumper attaching brackets; and FIG. 7 is a sectional view taken along the line 7—7 of FIG. 6.

DESCRIPTION OF THE PREFERRED EMBODIMENT

Figure 4:
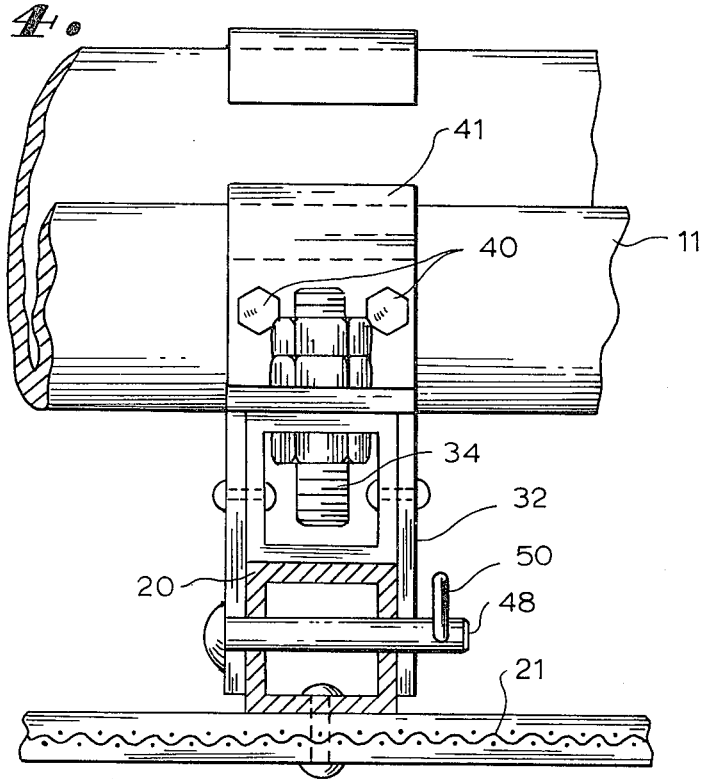
FIG. 4 is a sectional view taken along the line 4—4 of FIG. 1.
Figure 5:
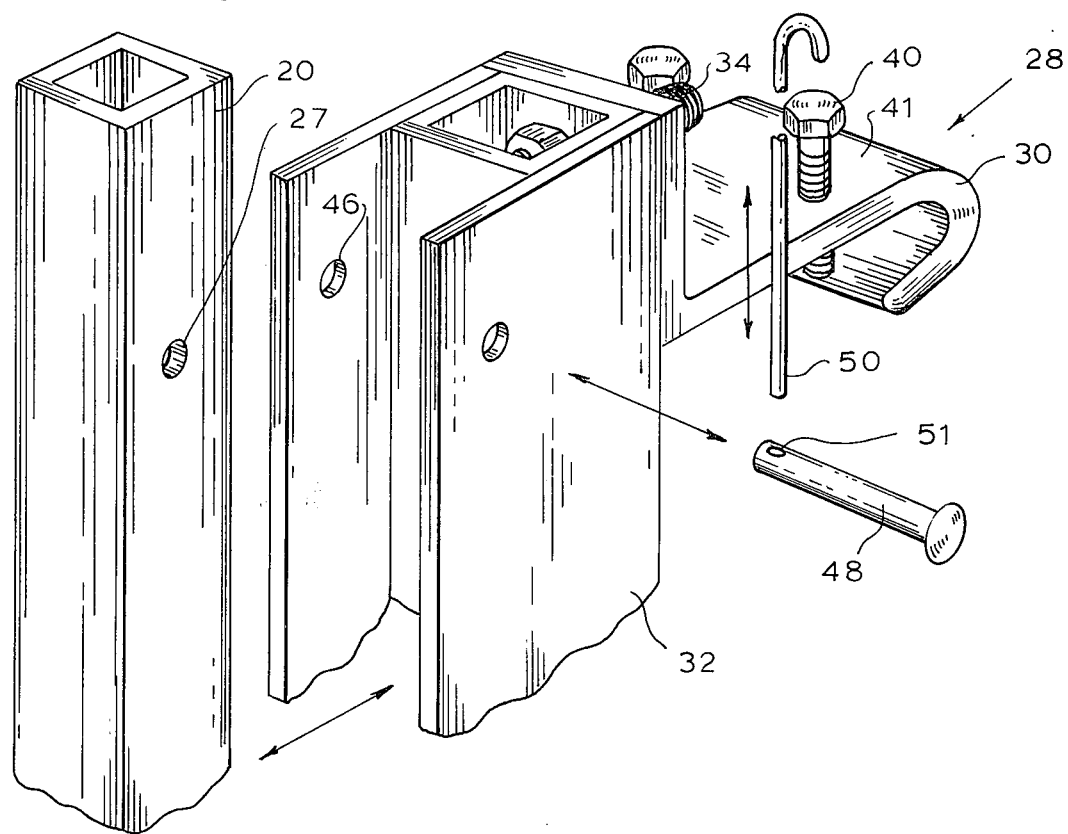
FIG. 5 is an exploded view of a portion of the bumper attaching bracket.

Referring to all of the figures of the drawings, an insect protection apparatus system 10 is illustrated attached to a bumper 11 of a vehicle 12. Vehicle 12 has a windshield 13 and tires 14 and a hood 15 and headlights 17. The insect protection system 10 has a pair of rigid frame portions 18 having a plurality of vertically extending frame members 20 which are used to attach the frame to the bumper 11 and a screen 21 which covers each frame 18. The protection system 10 also has the pair of frames 18 connected by a piano hinge 22 and has a wind deflector shield 23 attached to the top frame members 24 with a front brace 25 and bolts 26. Thus, the entire frame 18 can be folded on the hinges 22 when removed from the bumper 11 for easy storage in the trunk or garage. The frame members 20 extend below the rigid frame 18 and have openings 27 passing therethrough for attachment to the bumper brackets 28. The bumper brackets 28 include top hook member 30 and bottom hook members 31 which are each connected to an elongated frame supporting member 32. Top hook member 30 is attached to the top portion of the bumper 11 and is bolted with a nut and bolt 34 to the frame support member 32 while bottom hook member 31 is attached to the bottom portion of the frame support member by an elongated bolt 35 having a pair of nuts 36 and 37 for bolting to the bottom of the frame support member 32 and a nut 38 for attaching the bolt 35 to the hook 31 so that by rotating the nuts 36 and 37 the spacing between the hook 31 and the bottom of the frame support member 32 can be varied to align the frame support member 32 vertically relative to the bumper 11. In addition, a pair of bolts 40 are threadedly connected through the top of the hook 30 and abutt the bumper 11 so that the hook 30 can have its horizontal portion 41 adjusted for aligning the frame support member 32. The bottom hook 31 has a bolt 42 threadedly attached through the horizontal portion 43 of the hook 31 and abutting the bumper 11 for adjusting the hook 31 and for further aligning the frame support member 32. Frame support member 32 has an elongated base 44 and a pair of elongated members 45 attached perpendicular to base 44 and having a plurality of openings 46 therethrough and spaced to receive one extended portion 47 of frame members 20 for aligning the holes 27 with the openings 46 so that pins 48 can be inserted through the openings 46 and 27 to lock the frame members 20 to the bumper support brackets 28. Once these pins are inserted through the openings 27 of the frame member 20 and through opening 46 of the frame support member 32, a pin locking member 50 is there inserted through openings 51 in the pins 48. One elongated pin locking member 50 is adapted to extend through several lined up pins 48 for locking all the pins simultaneously. Thus, removing of the pin 50 allows the pins 48 to be removed rapidly for disconnecting the frame members 20 and frame 18 from the support brackets 28 for driving the vehicle through a car wash, or for storing in the trunk or garage during the off season. This also allows the rapid replacement of the protection system 10 on to the front of the vehicle and allows the frame support brackets 28 to remain attached to the bumper at all times thereby avoiding the problem of religning the brackets each time they are attached and removed.

Referring more specifically to FIG. 7 the attachment of the wind deflector shield 23 is illustrated being attached by its front brace 25 and nuts 26 passing therethrough and attaching to an angle brace 52 located on the opposite side from the brace 25. Brace member 25 is also bolted with bolts 53 to the frame member 20 and to the upper frame portion 24 which has the screen 21 attached thereto.

Turning to FIG. 6 the operation of the present system is more clearly illustrated in which the car 12 having the bumper 11 has a plurality of four bumper attaching brackets 28 attached thereto with upper hooks 30 and bottom hooks 31 connected with the elongated bolts 35. The plurality of frame support members 32 have plurality of three sets of openings 46 for each frame support member 32. Each pair of openings has a pin 48 therefore and each set of pins 48 having one pin holding pin 50. The frame support members 20 each have a set of three matching openings 27 and are attached to the frame 18 which in turn has the screen 21 and deflector shield 23 attached thereto. A pair of deflector shields 23 and frames 18 are illustrated attached together by piano hinge 22. It should of course be clear that other types of hinges could also be utilized without departing from the invention and that one rigid frame could be utilized but this would not generally be suitable for the large number of bumpers having different front curvatures thereto. At any rate the frame members 20 are aligned in the frame support members 32 with their holes 46 aligned with the holes 27 in the frame members 20 and the pins 48 inserted through the aligned openings. Pin locking pins 50 are then inserted through openings in the pins 48 to lock the pins in place. As can be seen in FIG. 6, the bug screen and shield can be easily disconnected from the bumper 11 by merely removing the pin locking pins 50 and removing the pins 48 so that the shield and screen can be removed for taking the car through a car wash or for storage during the off-season while leaving the bumper attaching brackets 28 attached to the bumper 11.

It should be clear at this point that an insect protection apparatus has been provided which can prevent insects from stopping up the radiator and covering the headlights of the vehicle and which also has a wind deflector shield for preventing insects from being smashed on the windshield of the vehicle. The insect protection apparatus, advantageously, has a bumper attaching bracket which can remain on the vehicle for quickly removing the screen and wind deflector shield which may be folded and stored. However, the present invention is not to be construed as limited to the particular forms illustrated which embodiments are to be considered as illustrative rather than restrictive.

I claim:

1. An insect protection apparatus for moving vehicles comprising in combination:
   frame means having a main portion and brace members extending below the main portion, each said brace member having at least one opening therein;
   a screen covering a portion of said frame means and attached thereto;
   bumper attaching means for attaching said frame means to a bumper to hold said screen in front of said vehicle, said bumper attaching means being removably connected to said frame means and having a plurality of top hook engaging members for attachment to a top edge of a vehicle bumper and a plurality of bottom hook members for attaching to a bottom edge of a vehicle bumper and a frame support member attached between each said hook member and one said bottom hook member, each said frame support member having openings therein and having spaced members for inserting one said frame means brace member;
   a plurality of pins removably attachable through said openings in each said frame support member and in each frame means brace member for removing and locking said frame to said frame support member; and
   means for aligning said bumper attaching means to align said frame vertically in front of said bumper whereby a framed screen may be attached to the front bumper of a vehicle.

2. The apparatus in accordance with claim 1 in which said frame means includes a pair of rigid frames hinged together.

3. The apparatus in accordance with claim 1 in which said means for aligning said bumper attaching means includes a plurality of bolts threaded through each top hook engaging member to vary the angle between said top hook members and a vehicle bumper and thereby varying the angle of said frame support member and attached frame means.

4. The apparatus in accordance with claim 3 in which said means for aligning said bumper attaching means includes a plurality of bolts threaded through each said bottom hook engaging member to vary the angle between said bottom hook members and a vehicle bumper.

5. The apparatus in accordance with claim 4 in which said means for aligning said bumper attaching means to align said frame includes an elongated bolt connecting each said bottom hook member to said frame support member so that the distance between said bottom hook member and said frame support member can be varied by adjusting nuts on said elongated bolt.

6. The apparatus in accordance with claim 1 in which an elongated pin locking pin attaches to a plurality of pins holding each frame support member in place by passing through openings in each of said plurality of pins.

7. The apparatus in accordance with claim 1 in which each said frame support member includes a base portion and a pair of spaced members forming a generally U-shaped cross-section for inserting elongated frame members for attachment thereto.

8. The apparatus in accordance with claim 7 in which said frame means has wind deflector shields attached along the top portion thereof between flat elongated front bracing members and rear angled support members each attached to said frame means.

* * * * *